United States Patent [19]
Languell

[11] Patent Number: 5,915,428
[45] Date of Patent: Jun. 29, 1999

[54] HEAD AND TAIL STOCKS FOR WOODWORKING LATHES

[76] Inventor: Clifford R. Languell, 934 Camden Dr., Columbia City, Ind. 46725

[21] Appl. No.: 09/013,940

[22] Filed: Jan. 27, 1998

[51] Int. Cl.⁶ .................................................. B27C 7/04
[52] U.S. Cl. .............................................. 142/53; 82/150
[58] Field of Search ................................ 142/53; 82/150, 82/170

[56] References Cited

U.S. PATENT DOCUMENTS

| | | | |
|---|---|---|---|
| 39,608 | 8/1863 | Williams | 82/170 |
| 60,169 | 12/1866 | Gardiner | 82/170 |
| 3,273,611 | 9/1966 | Hagquist et al. | 142/53 |
| 4,702,132 | 10/1987 | Grosse | 142/53 |

FOREIGN PATENT DOCUMENTS 1491622  7/1989  U.S.S.R. .................................. 142/53

Primary Examiner—Steven C. Bishop
Attorney, Agent, or Firm—Taylor & Associates, P.C.

[57] ABSTRACT

A method of and apparatus for positioning and supporting any of several different elongated workpieces of circular, substantially square, or substantially non-square rectangular cross-sectional configuration so that a central workpiece axis is located along the same axis for any one of said workpieces includes a tailstock fixture for supporting one end of the workpiece which includes a frustoconical cavity that extends coaxial with the axis for receiving the one end of the workpiece, and a headstock fixture for supporting a second end of the workpiece opposite the first end which includes a generally cylindrical cavity extending coaxial with the axis and four equiangularly spaced workpiece engaging blades within the cylindrical cavity for engaging and supporting the second workpiece end.

9 Claims, 2 Drawing Sheets

HEAD AND TAIL STOCKS FOR WOODWORKING LATHES

SUMMARY OF THE INVENTION

The present invention relates generally to headstock and tailstock chucks, fixtures and similar devices for holding a workpiece during a machining operation and more particularly to headstock/tailstock fixture combination for holding wooden or similar workpieces during a turning operation in a lathe.

Wood or metal turning lathes typically employ a "live" center for drivingly engaging one end of a workpiece, or a three or four jawed chuck for similarly drivingly gripping one end of a workpiece, and a "dead" center for supporting the onposite freely rotatable end of the workpiece. The use of live or dead centers requires the preliminary locating of the center of each end of the workpiece before mounting it for a turning operation. The use of a chuck requires adjusting the chuck jaws to securely grip the workpiece. In either case, it is time consuming to mount the workpiece preliminary to the turning operation. Elimination of the need to find the center of the stock is highly desirable and greatly reduces the time required to mount the workpiece.

There have been a variety of attempts to eliminate this time consuming step. These include U.S. Pat. Nos. 39,608; 60,169; 95,694; 129,705; 2,370,918; 3,099,173; 3,273,611; and 4,702,132. as well as German DD 278,982 and Russian SU 1,491,622.

Of these known prior art attempts, several have employed conical surfaces, some with inner tapering slots. The slots are required for the headstock fixture to insure adequate driving force being applied to the workpiece. For example, Grosse 4,702,132 employs not only slots in the live center so that the workpiece may be driven, but also slots in the deadcenter. This works adequately for square stock, but fails for other rectangular cross-sectional stock, Gardiner 60,169 suggests three equiangularly spaced tapering blades as a livecenter. This works for circular cross-sectional stock, but utterly fails to center either square or other rectangular cross-sectional stock. others have suggested stepped inner surfaces, either circular or square.

Among the several objects of the present invention may be noted the provision of a workpiece gripping arrangement for a wood lathe; the provision nonadjustable head and tail stock fixtures for gripping a range of workpiece shapes and sizes; the provision of head and tail stock fixtures for a wood turning lathe which adapt to a wide variety of sizes and shapes without requiring the location of a workpiece center nor any adjustment to fit a particular workpiece; the provision of a pair of self-centering fixtures to replace the live and dead centers at the head and tail stocks respectively of a wood turning lathe; and the provision of a unique pair of clamps for gripping therebetween a variety of different workpieces. These as well as other objects and advantageous features of the present invention will be in part apparent and in part pointed out hereinafter.

BRIEF DESCRIPTION OF THE DRAWING

Corresponding reference characters indicate corresponding parts throughout the several views of the drawing.

Figure 1:
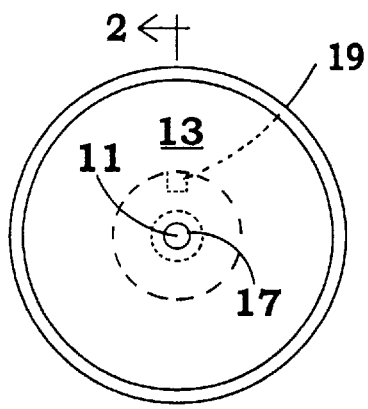
FIG. 1 is an end view of the working face of a tailstock fixture according to the present invention in one form.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

FIGS. 1, 2, 10 and 11 illustrate a tailstock fixture for supporting one end of a workpiece 35 or 37. This fixture includes a frustoconical cavity 13 which is coaxial with the axis 11. The frustoconical cavity 13 is shaped and positioned so as to cause the center of an end of circular as well as both square and non-square rectangular work-pieces to be positioned along the axis 11 which is coaxial with the turning axis of a lathe. The tailstock fixture has a hub 15 with a central hole 17 and an internally threaded region for attachment to the lathe tailstock. There is also a hole 19 in the hub sidewall for receiving a conventional lathe chuck wrench.

FIGS. 3–9 illustrate a headstock fixture for supporting the other end of the workpiece 35 or 37. The headstock fixture comprises a circular baseplate 25 forming the inner endwall of the cylindrical cavity; a hollow cylindrical sleeve 21 having an end portion surrounding the baseplate and extending therefrom forming the cylindrical cavity for receiving the four triangularly shaped blades 23; and a hub portion 27 fixed to and extending from the base portion opposite the sleeve 21. The hub includes an inner threaded portion 28 for fastening the fixture to the headstock and a sidewall hole 33 similar to the hole 19 in the tailstock fixture. When assembled on a lathe, the hub 27, hub threaded portion 28, baseplate 25 and sleeve 21 are all coaxial with the axis 12 as well as the turning axis of the lathe.

Figure 4:
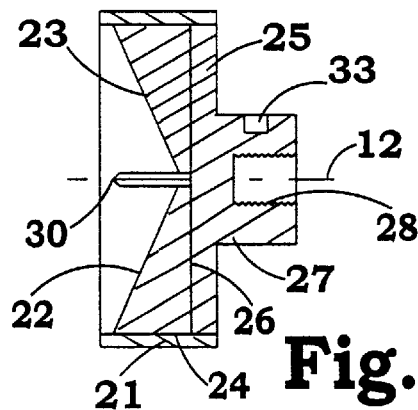
FIG. 4 is a view in cross-section along lines 4—4 of FIG. 3.
Figure 5:
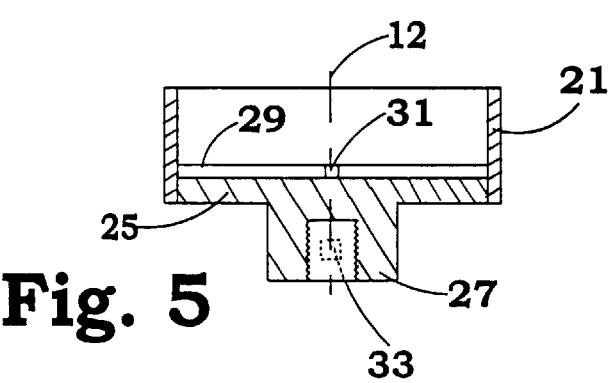
FIG. 5 is a view in cross-section along lines 5—5 of FIG. 3, but with the four gripping blades removed.
Figure 7:
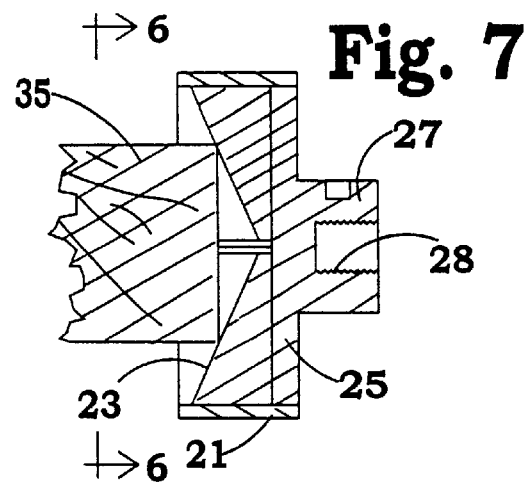
FIG. 7 is a view in cross-section along lines 7—7 of FIG. 6.
Figure 9:
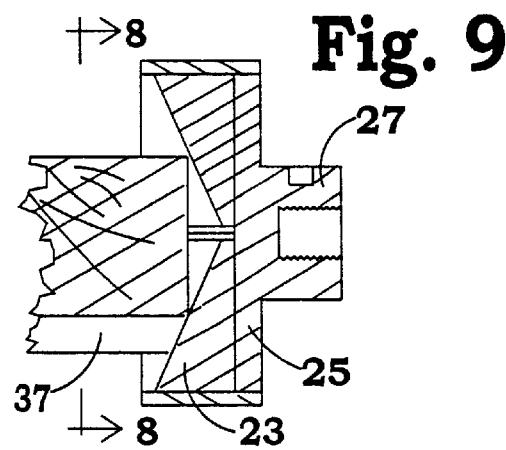
FIG. 9 is a view in cross-section along lines 9—9 of FIG. 8.

This headstock fixture has a generally cylindrical cavity coaxial with the axis 12 and four equiangularly spaced workpiece engaging blades 23 within the cylindrical cavity for engaging and supporting the second workpiece end. As best seen in FIGS. 4, 7 and 9, each of the four blades 23 comprises a generally flat right triangular metal blade including a first shorter edge 24 fixed to an inner cylindrical sidewall surface of the cylindrical cavity, a second shorter edge 26 fixed to an inner endwall of the cylindrical cavity, and a hypotenuse edge 22 extending generally from the cylindrical sidewall to the endwall. Each hypotenuse edge is sharpened along two 45 degree bevels as seen at 30 to securely grip the workpiece. The blades are seated in a pair of orthogonal slots 29 and 32 in the baseplate 25 as best seen in FIG. 5 and are welded in place.

Figure 8:
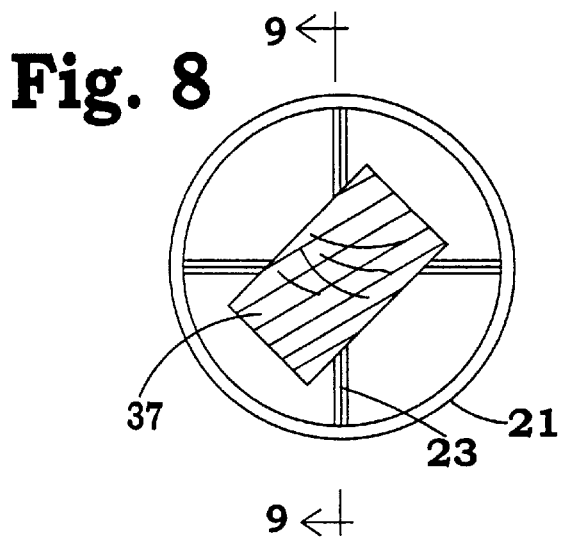
FIG. 8 is a view similar to FIG. 6, but showing a rectangular workpiece in gripped position.

The fixture of FIGS. 3–9 adapts to a fairly wide range of workpiece sizes. The blades include radially inner portions which will drivingly engaging an end edge of a relatively small rectangular workpiece as well as radially outer portions for drivingly engaging an end edge of a relatively larger rectangular workpiece. Rectangular workpiece 37 of FIGS. 8 and 9 is of an intermediate size. The radially inner portions are more closely adjacent to the baseplate 25 and to one another than said radially outer portions. Each of the blades 23 is relatively sized and positioned so as to cause the center of an end of circular as well as both square 35 and non-square rectangular 37 workpieces to be positioned along the axes 11, 12 and the turning axis of a lathe.

Figure 6:
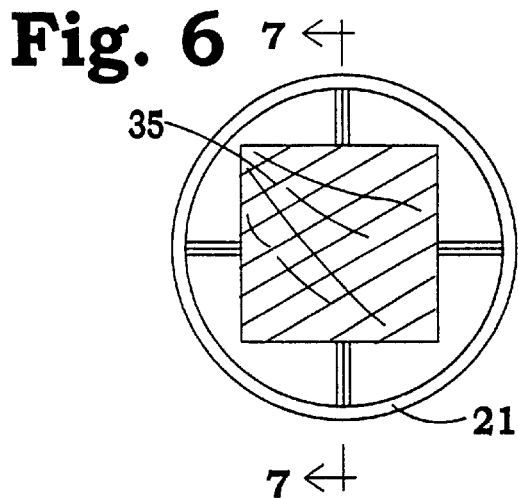
FIG. 6 is a view similar to FIG. 3. but showing a square cross-sectional workpiece in gripped position.
Figure 10:
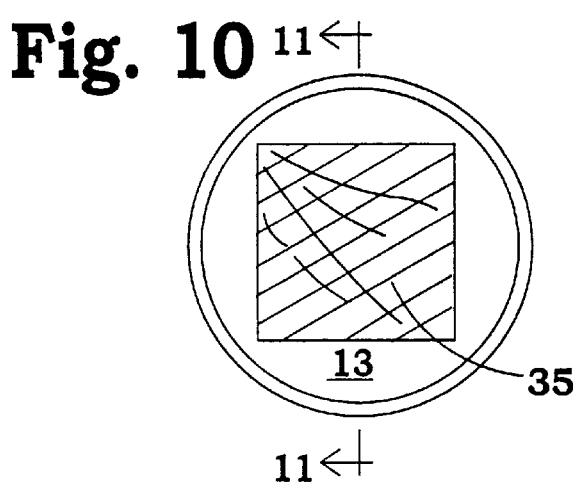
FIG. 10 is a view similar to FIG. 1, but showing a square cross-sectional workpiece in gripped position.
Figure 11:
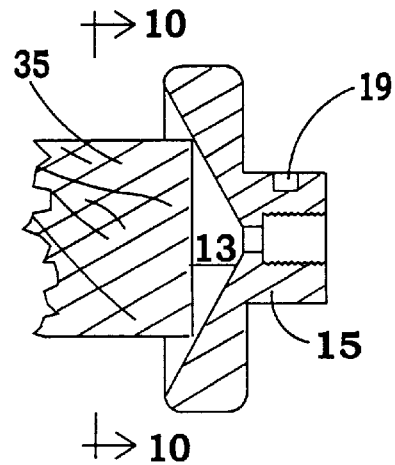
FIG. 11 is a view in cross-section along lines 11—11 of FIG. 7 10.

If the workpiece is of a circular cross-sectional configuration, one end is engaged about substantially the entire periphery by the frustoconical cavity 13 and the opposite end is engaged along four equiangularly spaced narrow regions around the periphery of that circular end. If the workpiece is of a substantially square cross-sectional configuration, one end is engaged along four narrow regions near the respective corners of the square by the concavity 13 as shown in FIGS. 10 and 11 while the opposite end is engaged along four narrow regions each located centrally along a corresponding edge of the square as seen in FIGS. 6 and 7. If the workpiece is of a substantially rectangular non-square cross-sectional configuration such as a conventional "2×4", one workpiece end is again engaged along four narrow regions near the respective corners of the rectangle, however, these are no longer equiangularly spaced, and the opposite workpiece end is engaged along four narrow regions all of which are located along the two opposite longer sides of the rectangle as seen in FIG. 8.

Figure 12:
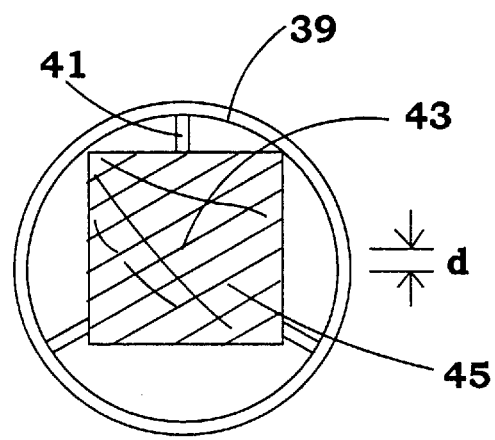
FIG. 12 is a view similar to FIGS. 6 and 8, but illustrating why a three bladed chuck is inadequate to center a workpiece of square cross-sectional configuration.

In FIG. 12, a headstock fixture 39 having three blades 41 is shown engaging a square workpiece. This fixture centers circular workpieces adequately, but for rectangular workpieces, the center of the fixture is located at 45 while the center of the workpiece is at 43. The distance d separates these centers. With this configuration, considerable difficulty is encountered, and a substantial amount of wasted wood must be removed in order to turn, for example, a table leg. It is highly desirable that the workpiece center 43 and fixture center 45 be at substantially the same location, but this can not be achieved for square or rectangular cross-sectional workpieces with the three bladed fixture of FIG. 12.

Figure 2:
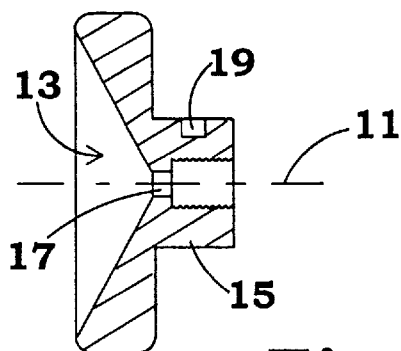
FIG. 2 is a view in cross-section along lines 2—2 of FIG. 1.
Figure 3:
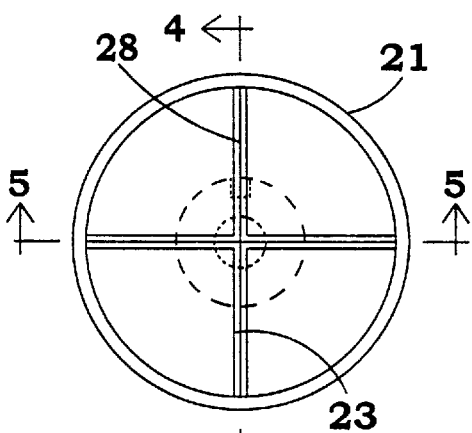
FIG. 3 is an end view of the working face of a headstock fixture according to the present invention in one form.

In a particular preferred form of tailstock fixture such as illustrated in FIGS. 1 and 2, the conical taper angle between the center line or axis 11 and the sidewall of the cone 13 was 55 degrees. For that preferred tailstock embodiment, the overall diameter was 3¼ inches and the outer rim was about ¾ inch in length (outer thickness). The hub 15 was 1¼ inches in diameter and about ¾ inch in length resulting in an overall length of 1⅝ inches. The central threaded hole for attaching the tailstock fixture to a conventional lathe was a ½–20 threaded hole. There was a ¼ inch diameter central through hole 17 and a ¼ inch diameter wrench hole 19 in the sidewall of the hub 15.

In a particular preferred form of headstock fixture such as illustrated in FIGS. 3–8, the cylindrical shell or rim 21 had an outside diameter of 3¼ inches, an inner diameter of 3⅛ inches and was about 1⅛ inches in axial length. A slightly greater axial extent may be preferred in some applications. The gripping blades 23 each had a radial dimension of about 1½ inches and had an axial extent of about 1¼ inches. This resulted in a taper angle of about 35 degrees. The gripping edges (hypotenuse of the triangle) were sharpened at 45 degrees on each side. The hub or baseplate 25 had an outer diameter of 3⅛ inches while the diameter of the base portion 27 was 1¼ inches. The threaded hole in the base portion for attaching the headstock fixture to a conventional wood turning lathe was a ¾–16 threaded hole. The orthogonal gripping blade receiving slots 29 and 31 were about ⅛ inch square in cross-section. The axial extent of the greater diameter portion of the hub was ⅜ of an inch while the base portion of the hub was ⅝ inch in length. This resulted in an overall axial extent of 1 inch. As with the tailstock fixtures a ¼ inch diameter wrench hole 33 in the sidewall of the hub base portion 27 was provided.

From the foregoing, it is now apparent that a novel workpiece gripping headstock and tailstock arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A wood turning lathe having a free-wheeling tailstock and a power driven headstock for rotating a workpiece about an axis including:

a tailstock fixture for supporting one end of the workpiece including a frustoconical cavity coaxial with said axis for receiving said one end of the workpiece, said frustoconical cavity being shaped and positioned to cause the center of an end of circular as well as both square and non-square rectangular workpieces to be positioned along said axis;

a headstock fixture for supporting a second end of the workpiece opposite said one end including a generally cylindrical cavity coaxial with said axis and four equiangularly spaced workpiece engaging blades within the cylindrical cavity for engaging and supporting said second workpiece end, each of said blades being relatively sized and positioned to cause the center of an end of circular as well as both square and non-square rectangular workpieces to be positioned along said axis.

2. The wood turning lathe of claim 1 wherein each of said four blades comprises a generally flat right triangular metal blade including a first shorter edge fixed to an inner cylindrical sidewall surface of the cylindrical cavity, a second shorter edge fixed to an inner endwall of the cylindrical cavity, and a hypotenuse edge extending generally from the cylindrical sidewall to the endwall.

3. The wood turning lathe of claim 2 wherein each hypotenuse edge is sharpened to securely grip the workpiece.

4. The wood turning lathe of claim 1 wherein the headstock fixture comprises a circular baseplate forming the inner endwall of the cylindrical cavity; a hollow cylindrical sleeve having an end portion surrounding the baseplate and extending therefrom forming the cylindrical cavity for receiving the four blades; and a hub portion fixed to and extending from the base portion opposite said sleeve, the hub including an inner threaded portion for fastening the fixture to the headstock; the hub, hub threaded portion, baseplate and sleeve all coaxial with said axis.

5. The wood turning lathe of claim 1 wherein said blades each include radially inner portions for drivingly engaging and end edge of a relatively small rectangular workpiece and radially outer portions for drivingly engaging an end edge of a relatively larger rectangular workpiece.

6. The wood turning lathe of claim 5 wherein said radially inner portions are more closely adjacent to the baseplate and to one another than said radially outer portions.

7. The method of positioning and supporting any of several different elongated workpieces of circular, substantially square, or substantially non-square rectangular cross-sectional configuration so that a central workpiece axis is located along the same axis for any one of said workpieces comprising the steps of:

engaging one workpiece end along the periphery thereof with a frustoconical concavity having an axis coaxial with said axis; and engaging an opposite workpiece end about the periphery thereof with four blade edges whereby, when the workpiece is of a substantially rectangular non-square cross-sectional configuration, said one workpiece end is engaged along four narrow regions near the respective corners of the rectangle, and the opposite workpiece end is engaged along four narrow regions all of which are located along the two opposite longer sides of the rectangle.

8. The method of claim 7 wherein, when the workpiece is of a circular cross-sectional configuration, said one workpiece end is engaged about substantially the entire periphery thereof, and the opposite workpiece end is engaged along four equiangularly spaced narrow regions.

9. The method of claim 7 wherein, when the workpiece is of a substantially square cross-sectional configuration, said one workpiece end is engaged along four narrow regions near the respective corners of the square, and the opposite workpiece end is engaged along four narrow regions each located centrally along a corresponding edge of the square.

* * * * *